(12) United States Patent
Lindenschmidt et al.

(10) Patent No.: US 7,025,188 B2
(45) Date of Patent: Apr. 11, 2006

(54) PARKING LOCK FOR AN AUTOMATED TRANSMISSION OF A MOTOR VEHICLE

(75) Inventors: Christoph Lindenschmidt, Rheinstetten (DE); Reinhard Berger, Buehl (DE)

(73) Assignee: LUK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/841,135

(22) Filed: May 7, 2004

(65) Prior Publication Data

US 2004/0237694 A1    Dec. 2, 2004

(30) Foreign Application Priority Data

May 8, 2003    (DE) ................................. 103 20 436

(51) Int. Cl.
*B60T 1/06* (2006.01)
(52) U.S. Cl. ..................... 192/219.5; 74/411.5; 188/31
(58) Field of Classification Search ............. 192/219.5; 188/31; 74/411.5
See application file for complete search history.

(56) References Cited

U.S. PATENT DOCUMENTS

| | | | | | |
|---|---|---|---|---|---|
| 4,200,002 | A | * | 4/1980 | Takahashi | 74/530 |
| 4,413,712 | A | * | 11/1983 | Richard | 192/219.5 |
| 5,269,195 | A | * | 12/1993 | Kitagawara | 74/411.5 |
| 6,065,581 | A | * | 5/2000 | Nogle | 192/219.5 |
| 6,471,027 | B1 | * | 10/2002 | Gierer et al. | 192/219.5 |
| 6,823,976 | B1 | * | 11/2004 | Schmid | 192/219.5 |

FOREIGN PATENT DOCUMENTS

DE    10259893 A1 *    7/2003

* cited by examiner

*Primary Examiner*—Richard M. Lorence
(74) *Attorney, Agent, or Firm*—Davidson, Davidson & Kappel, LLC

(57) ABSTRACT

A parking lock for an automated transmission of a motor vehicle includes a first spring-type actuator for engaging the parking lock, a transmission actuator, a release device operable using the transmission actuator for disengaging the parking lock, and a retaining device. The retaining device is configured to counteract at least one of the spring-type actuator and a second spring-type actuator so as to hold the parking lock in a disengaged state.

13 Claims, 3 Drawing Sheets

PARKING LOCK FOR AN AUTOMATED TRANSMISSION OF A MOTOR VEHICLE

Priority is claimed to German Patent Application No. DE 103 20 436.9, filed on May 8, 2003, the entire disclosure of which is incorporated by reference herein.

The present invention relates to a parking lock for an automated transmission of a motor vehicle.

BACKGROUND

Automated shift transmissions for motor vehicles usually have a mechanically operating parking lock device in which a locking device is operated to reach the locking position. The locking device is, for example, a locking pawl which engages the teeth of a parking lock gear which is connected to the output of the transmission, and thus to an axle of the vehicle. Usually, the parking lock is engaged by a spring-type actuator whose spring tension moves an actuating element of the locking device in such a manner that the locking pawl is locked in the direction of its motion, and able to snap into engagement with the teeth of the parking lock gear. To disengage the parking lock, a release device is required that allows the parking lock to be released. Usually, the release device is operated by a drive, such a hydraulic drive, additionally provided for this. In the disengaged state, the parking lock can be held by a retaining device, such as a solenoid with a retaining mechanism. During this, the retaining device must provide a retention force counteracting the spring tension of the spring-type actuator.

The retaining device must be designed in such a manner the retention force of the retaining device is greater than the spring tension of the spring-type actuator. In order to provide the retention force, high power consumption is required, for example, for a solenoid. If the retaining device is operated by a solenoid, the parking lock remains in the disengaged state as long as the solenoid is energized. Using a solenoid in the retaining device ensures that, in the event of an electrical power failure, the retaining device is disengaged, allowing the parking lock to be engaged. In this connection, the problem may arise that the parking lock is engaged at a vehicle speed at which the transmission would be damaged. Therefore, engagement of the parking lock at a vehicle speed greater than a certain limit vehicle speed must be avoided. It is an object of the present invention to further develop a parking lock for an automated transmission of a motor vehicle of the type mentioned at the outset in such a manner that the parking lock can be engaged and disengaged in a reliable and simple manner.

SUMMARY OF THE INVENTION

The present invention provides a parking lock for an automated transmission of a motor vehicle including a first spring-type actuator for engaging the parking lock, a transmission actuator, a release device operable using the transmission actuator for disengaging the parking lock, and a retaining device configured to counteract at least one of the spring-type actuator and a second spring-type actuator so as to hold the parking lock in a disengaged state.

To release the engaged parking lock, a release device is required that allows the transmission to be unlocked again. Advantageously, the release device of the parking lock according to the present invention is operable by a transmission actuator. For this purpose, the release device may have a parking lock shift rail which is operable by a shift finger of a transmission actuator and has to be brought into engagement therewith. This allows the parking lock to be disengaged using an already existing transmission actuator of the automated shift transmission, without requiring an additional drive for operating the release device. Thus, an additional drive as is needed in the known parking lock devices, such as a hydraulic system with a pressure accumulator for operating the release device, is avoided.

Advantageously, the release device of the parking locks according to the present invention is disposed in operative connection with at least one spring-type actuator. After the parking lock has been disengaged by operating the release device, the release device must be closed when re-engaging the parking lock. In accordance with the present invention, this may be achieved via the operative connection to at least one spring-type actuator. The operative connection may, for example, be in such a form such that when disengaging the parking lock with the release device, said spring-type actuator is preloaded with spring tension, and that the release device may be reclosed by the action of the spring tension once the parking lock is disengaged. This has the advantage that when the spring-type actuator is suitably rated, the release device can be closed only by the action of the spring tension of the first spring-type actuator. This eliminates the need for an additional drive for closing the release device.

In another advantageous embodiment of the parking lock according to the present invention, a first spring-type actuator having a spring tension is provided to close the release device, and a second spring-type actuator having a spring tension is provided to operate a locking device for engaging the parking lock. In accordance with the present invention, two spring-type actuators whose spring tensions may act independently of each other may be provided for operating the parking lock. This allows the release device and the locking device to be operated independently of each other. For example, the release device may be disposed such that when disengaging the parking lock, a first spring-type actuator which is disposed in operative connection with the release device preloaded with a spring tension, whose action allows the release device to be immediately reclosed after the parking lock is disengaged. At the same time, the locking device disposed in operative connection with the second spring-type actuator may be held by a retaining device in the open state against the spring tension from the second spring-type actuator, and be operated by the spring tension of the second spring-type actuator for engaging the parking lock. Thus, it is achieved that, in order to engage the parking lock, the second spring-type actuator must only provide a spring tension for operating the locking device. This allows the use of spring-type actuators of different spring tension for operating the parking lock. For example, the first spring-type actuator for closing the release device may have a significantly higher spring tension than the second spring-type actuator for operating the locking device during engagement of the parking lock.

The inventive parking lock containing release device is advantageously disposed in operative connection with the first spring-type actuator in such a manner that the first spring-type actuator may be preloaded with spring tension as the parking lock is disengaged by the release device. In accordance with the present invention, the release device may have a movable parking lock shift rail which is disposed in operative connection with the first spring-type actuator, and which may be moved against the spring tension of the first spring-type actuator when operating the release device to disengage the parking lock, and thereby preloads the first spring-type actuator.

In a further advantageous embodiment of the parking lock according to the present invention, the first spring-type actuator has a spring tension such that when the parking lock has been disengaged, the release device may be moved to a predetermined position only by the action of said spring tension. In accordance with the present invention, when the parking lock is disengaged by operating the release device, the first spring-type actuator is preloaded. According to the present invention, the first spring-type actuator may be designed in such a manner that the spring tension produced by the preload is sufficient to move an actuating element of the release device, such as a parking lock shift rail including the release device, back to its original position. Thus, it is achieved that, after the release device has been operated to disengage the parking lock, the release device may be reclosed only by the action of the spring tension of the first spring-type actuator, and that the parking lock may be re-engaged again by operating the locking device. In this connection, the predetermined position of the release device may correspond to its original position, for example, to the position of the neutral selection gate of the shift finger of the automated shift transmission if the release device is operated by a shift finger of a transmission actuator which shift finger is brought into engagement with a parking lock shift rail. This is of particular importance when the transmission actuator fails while the parking lock is in the disengaged state, such as in the event of an electrical power failure. Then, in order to close the release device, for example, a parking lock shift rail that is engaged with the shift finger of a transmission actuator must be able to be operated by moving it back to its original position against the forces from the transmission actuator system without the use of the transmission actuator. Therefore, the first spring-type actuator is advantageously designed such that its spring tension is sufficient to reclose the release device against the forces of an actuator system in the event of a failure of the transmission actuator. This has the advantage that when the transmission actuator fails, the release device may be closed by the spring tension of the first spring-type actuator, allowing the parking lock to be re-engaged.

Advantageously, the release device of the parking lock according to the present invention is disposed in operative connection with the locking device in such a manner that when the parking lock is disengaged by the release device, the locking device is opened, and the transmission is unlocked. In accordance with the present invention, the operative connection between the release device and the locking device may be designed in such a manner that the parking lock shift rail contained in a release device is arranged in the line of force with an actuating element of the locking device for releasing the same. In this connection, the release device may include a lever which is fixedly connected to the parking lock shift rail and which, when the release device is operated to disengage the parking lock, moves into engagement with an actuating element of the locking device, such as a cone movably disposed on a tube or a movable slider, driving the locking device along with the parking lock shift rail until the locking device is released and the transmission is unlocked.

In an inventive further development of the parking lock according to the present invention, the operative connection between the release device and the locking device is releasable. In accordance with the present invention, after the parking lock has been disengaged, for example, the lever of the release device that is fixedly connected to the parking lock shift rail is in engagement with the actuating element of the locking device. For the purpose of closing the release device, the lever fixedly connected to the parking lock shift rail is arranged with respect to the actuating element of the locking device in such a manner that it may be released in the direction of a closing movement of the release device. In this manner, the parking lock shift rail with the lever may, for example, be moved back to the original position after the parking lock has been disengaged, while at the same time the parking lock may be held in the disengaged state by a retaining device via the actuating element. Thus, it is achieved that the release device may be immediately reclosed after the parking lock is disengaged, and that at the same time the parking lock may be held in the disengaged state, and re-engaged only by operating the locking device. This has the advantage that, in order to engage the parking lock, the second spring-type actuator must only provide a spring tension which is necessary to operate the locking device. Thus, the above-mentioned high resistive forces that may occur when closing the release device need not be considered in the rating of the second spring-type actuator. This has the advantage that the second spring-type actuator must only have a low spring tension for engaging the parking lock.

According to an advantageous refinement of the inventive parking lock, the spring tension of the second spring-type actuator is lower than that of the first spring-type actuator. In accordance with the present invention, the first spring-type actuator is provided for closing the release device. Therefore, the first spring-type actuator must be designed in such a manner that its spring tension in the loaded state after the parking lock has been disengaged is sufficient to reclose the release device. This requires a high spring tension, as already explained. In accordance with the present invention, engagement of the parking lock by the second spring-type actuator, by contrast, requires a low spring tension for operating the locking device.

In another inventive embodiment of the parking lock according to the present invention, the retaining device is arranged such that it counteracts the spring tension from the spring-type actuator having the lower spring tension. In accordance with the present invention, a retaining device is necessary to hold the parking lock in the disengaged state. For this purpose, the retaining device must provide a retention force greater than the counteracting spring tension from the preloaded spring-type actuator for engaging the parking lock. To engage the parking lock, the retaining device may be released, allowing the spring tension to be released from the spring-type actuator for operating the locking device. In accordance with the present invention, it is conceivably possible to dispose the retaining device in operative connection with the first spring-type actuator for closing the release device. Then, the retaining device must hold the parking lock in the disengaged state against the spring tension from the first spring-type actuator. However, this requires the retaining device to have a high retention force because, as already described, the first spring-type actuator must have a high spring tension for closing the release device. In accordance with the present invention, the retaining device is disposed in operative connection with the second spring-type actuator since this actuator has a lower spring tension for operating the locking device than the first spring-type actuator, as already explained. This leads to the advantage that the retention force to be provided by the retaining device for holding the parking lock in the disengaged state is lower than when the retaining device is disposed in operative connection with the first spring-type actuator. Thus, the retention force to be provided by the retaining device can be significantly reduced. If, for example, the retaining device uses a solenoid to hold the parking lock in the disengaged state, a solenoid having lower power consumption may be used in the system according to the present invention. In this manner, the electrical power consumption of the solenoid in the disengaged state of the parking lock may be reduced by about 30%. This allows the parking lock to be maintained in the disengaged state for a certain period of time, for example, 30 minutes, for operational reasons even after the combustion engine has been turned off without the risk of overloading and discharging the vehicle battery by the electrical power consumption of the solenoid.

The present invention also provides a parking lock for a transmission of a motor vehicle, including a locking device having an actuating element, a parking lock gear having a plurality of teeth, and a locking pawl in operative connection with the teeth, so that the locking pawl is operatable to engage the teeth for locking the transmisstion at vehicle speeds less than the predetermined vehicle speed and the locking pawl is prevented from engaging the teeth of the parking lock gear at vehicle speeds greater than a predetermined limit vehicle speed. The actuating element is is operatable so as to block movement of the locking pawl and engage the parking lock.

In the case of automatically operated parking locks, operational requirements require the parking lock to be engagable in case the automatic actuation system fails, for example, in the event of an electrical power failure. This is usually accomplished by using a solenoid in a retaining device, the solenoid holding the parking lock in the disengaged state. The retaining device may be disposed such that when the electrical supply voltage to the solenoid fails, the spring tension from a preloaded spring-type actuator for operating the locking device may be released, allowing the parking lock to be engaged. In such a case, it may happen that the parking lock is actuated for engagement at high vehicle speed due to a failure. To prevent the transmission from damage, it must be ensured that the parking lock cannot be engaged at vehicle speeds greater than a certain limit vehicle speed, for example, about 5 km/h. This can be achieved in that the geometry of the locking pawl and the teeth of the parking lock gear, which are engaged with each other in the locking position, are designed to be non-self-locking. When a torque is applied to the parking lock gear at higher vehicle speeds, the locking pawl is then forced out of the teeth of the parking lock gear, preventing the locking pawl from engagement. Engagement of the locking pawl into the locking position is only possible if a certain period of time is available for the locking pawl to slip in between the teeth of the parking lock gear to a sufficient depth, and if the locking pawl is prevented from moving out of engagement with the teeth of the parking lock gear through the operative connection with a self-locking actuating element of the locking device, for example, a cone or a movable slider provided with a ramp contour. Thus, the parking lock can only be engaged at vehicle speeds lower than a limit vehicle speed. At vehicle speeds greater than the limit vehicle speed, the locking pawl is forced away, preventing engagement of the parking lock.

In an advantageous refinement of the parking lock according to the present invention, the tip of the locking pawl has a specific contour such that when the locking pawl is prevented from snapping into engagement with the teeth of the parking lock gear, the stress on the contacting parts of the locking pawl and the teeth of the parking lock gear is minor. In the event that the locking pawl is forced away during an attempt to engage the parking lock at a vehicle speed greater than the limit vehicle speed, the locking pawl repeatedly slips in between teeth of the parking lock gear, and is forced out again in this process. This state, which is referred to as "ratcheting", is characterized by a permanently repeated striking of the locking pawl and the sides of the tooth spaces of the parking lock gear. As a result of this, an impact is produced each time the locking pawl and the tooth space side strike each other, resulting in continuous dynamic stress and, as a consequence, in reduced life of the components mentioned. According to the present invention, the tip of the locking pawl may be provided with a contour, such as a bevel, that significantly reduces the impacts when the locking pawl is forced away. Thus, the stress on the locking pawl and the teeth of the parking lock gear can be reduced. It is also conceivable that, other than in the case of a bevel, the contour is not just a straight line, but a specific curve shape.

According to another inventive embodiment of the parking lock according to the present invention, the contour is formed by a bevel on one flank of the locking pawl. In accordance with the present invention, a bevel is made on the side of the tip of the locking pawl at which the locking pawl the contacts the tooth back when the locking pawl is forced away. Thus, it is achieved that the locking pawl is forced away via the portion of the flank of the locking pawl that is flattened by the bevel. This has the advantage that the impacts occurring when the locking pawl is forced away can be significantly reduced, allowing the life of the components mentioned to be significantly increased.

In an advantageous refinement of the parking lock according to the present invention, the contour has a bevel on each of the two flanks of the locking pawl. Thus, in the event that the locking pawl is forced away, the stress on the locking pawl and the teeth of the parking lock gear can be reduced both when driving forward and when reversing.

The proposed parking lock may be used in automated and non-automated shift transmissions of motor vehicles.

BRIEF DESCRIPTION OF THE DRAWINGS

The present invention will be described in more detail hereinafter, by way of example, with reference to schematic drawings, in which.

DETAILED DESCRIPTION

Figure 1:
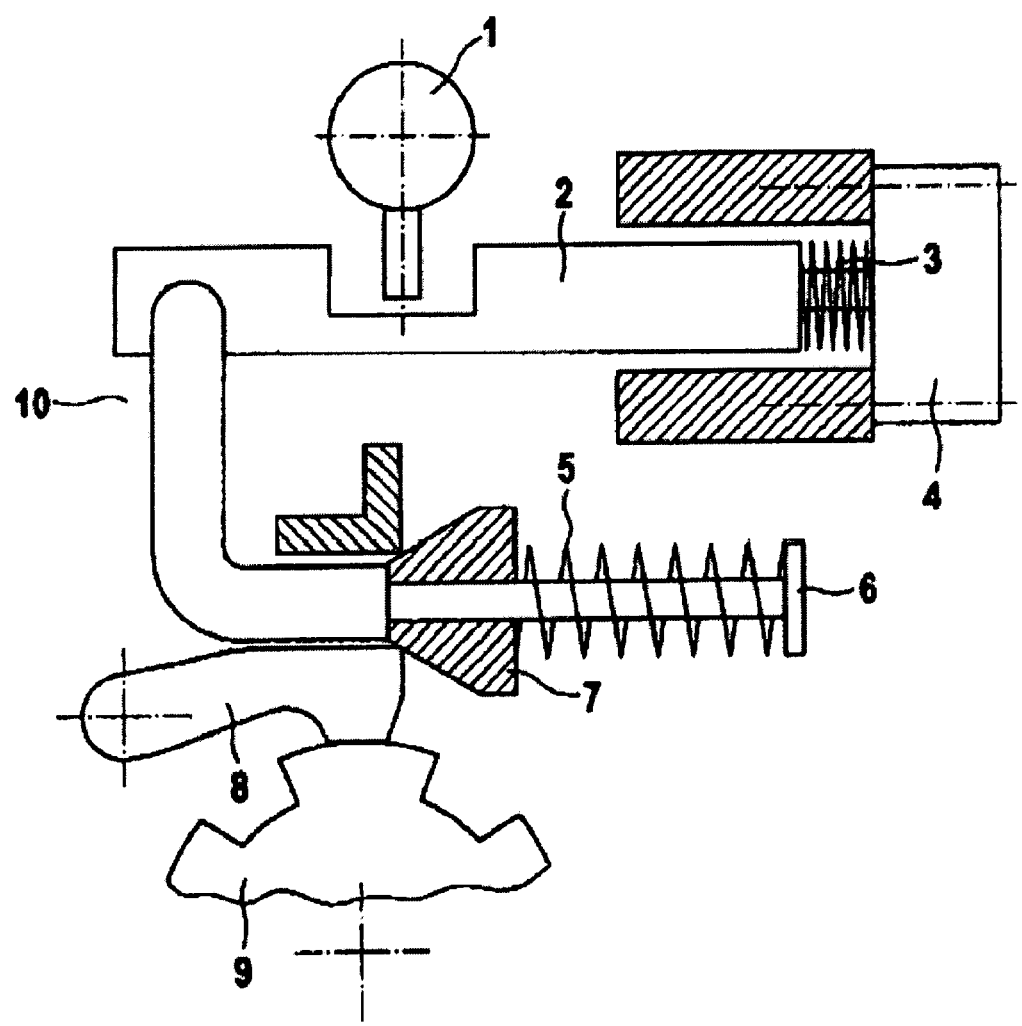
FIG. 1 shows a schematic representation of a parking lock according to the present invention for an automated transmission of a motor vehicle.

The parking lock in FIG. 1 includes a release device (10) which is operable by a transmission actuator; the retaining device (4) being disposed in operative connection with first spring-type actuator (3). The Figure shows the parking lock in the disengaged state. Shift finger (1) of the transmission actuator may be engaged with parking lock shift rail (2). To disengage the parking lock, shift finger (1) moves parking lock shift rail (2) to the right into the position shown. In the process, first spring-type actuator (3) is loaded and held by a solenoid (4) and a retaining mechanism. In the event of a failure of the transmission actuator, the spring tension of first spring-type actuator (3) allows shift finger (1) to be moved back into the neutral selection gate of a gear selection device of an automated shift transmission. Therefore, first spring-type actuator (3) has a high spring tension. When moving rail (2), a rod (6) fixedly connected thereto is also moved at the same time. In this manner, cone (7), which is disposed on rod (6), is moved to the position shown. Due to the ramp contour of the cone, locking pawl (8) may then move upward in the diagram so that when a torque is applied to the parking lock gear (9), the locking pawl may move out of engagement with the teeth thereof, disengaging the parking lock. To engage the parking lock, solenoid (4) is de-energized. This allows first spring-type actuator (3) to relax, its spring tension moving rail (2) to the left in the diagram in order to close release device (10). In the process, rod (6) is also moved, and the second spring-type actuator, which is disposed in operative connection between the cone movably disposed on rod (6) and the end of the rod, is loaded by the cone with a spring tension counteracting the released locking pawl (8). To engage the parking lock, second spring-type actuator (5) is needed to move cone (7) to the left in the diagram until locking pawl (8) snaps back into engagement with the teeth of the parking lock gear again to reach the locking position. In this arrangement, retaining device (4) has to hold the parking lock in the disengaged state against the spring tension from first spring-type actuator (3).

Figure 2:
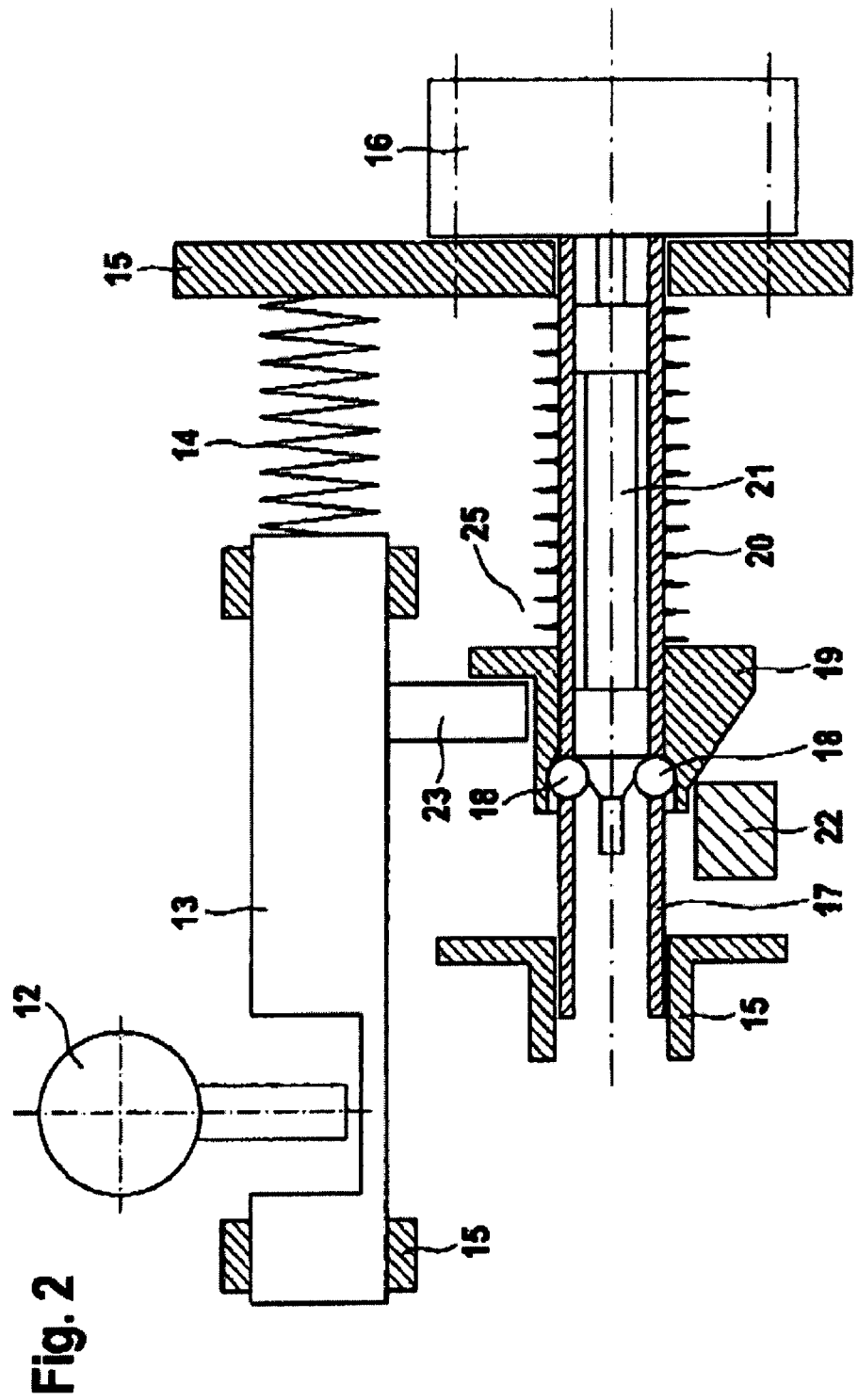
FIG. 2 shows a schematic representation of the parking lock according to the present invention with a retaining device.

In FIG. 2, the parking lock according to the present invention is schematically shown with retaining device (16, 18, 21) being disposed in operative connection with second spring-type actuator (20) for operating locking device (25). The Figure shows the parking lock in the disengaged position. To disengage the parking lock, shift finger (12) of the transmission actuator has to move parking lock shift rail (13) to the right in the diagram. In the process, first spring-type actuator (14) is preloaded. When rail (13) is moved to the right by actuation of shift finger (12), the rail also moves a lever (23) which is fixedly connected to the rail, and which moves a cone movably disposed on a tube (17) to the right in the diagram. Due to the ramp contour of the cone, locking pawl (22) may then move upward in the diagram so that the locking pawl may move out of engagement with the teeth of the parking lock gear, disengaging the parking lock. When cone (19) moves to the right, a second spring-type actuator (20) is preloaded at the same time. In the disengaged state of the parking lock, the cone is held by a solenoid (16) and a retaining mechanism (18, 21) against the spring tension from second spring-type actuator (20). To this end, solenoid (16) is energized. The resulting electromagnetic force moves pin (21) to the left in the diagram. However, this is only possible when the parking lock is disengaged, and the cone is located in its right position, as shown, so that balls (18) may be pressed outward through tube (17) by the movement of pin (21), unblocking the movement of pin (21). At the same time, via a slope, the balls block the movement of the cone to the left in the diagram. To engage the parking lock, solenoid (16) is de-energized. Then, the spring tension of the preloaded second spring-type actuator (20) forces balls (18) back into tube (17) via the slope. Because of this, the spring tension of the second spring-type actuator may move cone (19) back to the left in the diagram until locking pawl (22) snaps into engagement with the teeth of the parking lock gear to reach the locking position. Not much force is needed to move the cone until the locking pawl snaps into engagement so that the second spring-type actuator has only a low spring tension. This has the advantage that the retention force to be provided by solenoid (16) for holding the parking lock in the disengaged state is small. Thus, the electrical power consumption of the solenoid in the disengaged state of the parking lock is correspondingly low. With (15), a segment of the transmission housing is shown in a schematic way.

Figure 3:
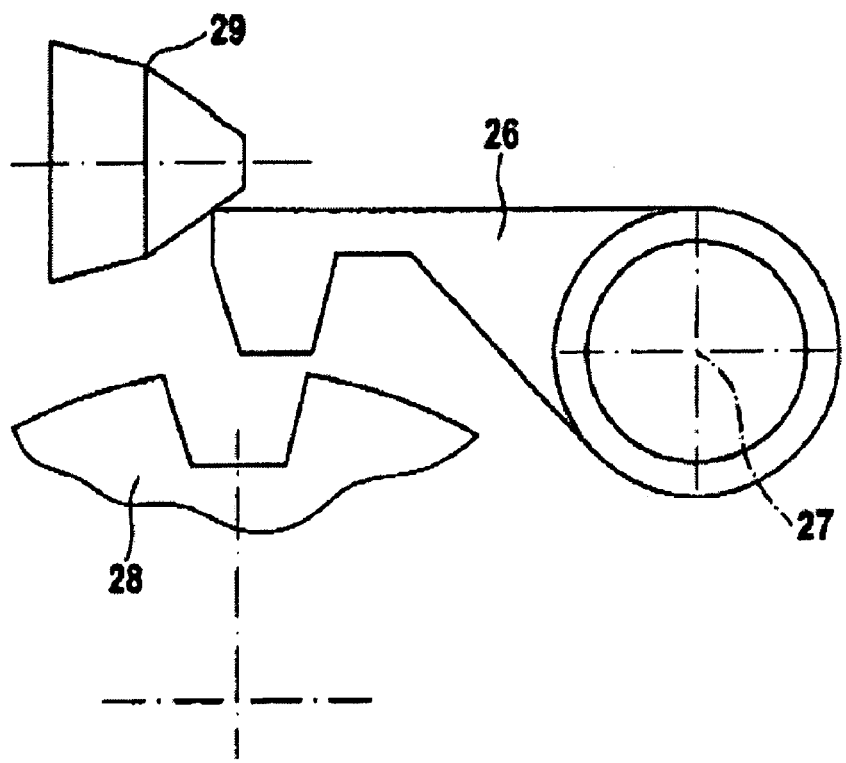
FIG. 3 shows an embodiment of the parking lock according to the present invention in the disengaged state.

FIG. 3 shows an embodiment of the parking lock according to the present invention in the disengaged state. To disengage the parking lock, cone (29) is moved to the left in the diagram until the ramp contour allows locking pawl (26) to move upward in the diagram to move out of engagement with the teeth of parking lock gear (28). By rotating locking pawl (26) about its center of rotation (27), the locking pawl may snap into engagement with parking lock gear (28) to reach the locking position and conversely, may move out of engagement to release the locking position. The interlocking connection between between the teeth of parking lock gear (28) and locking pawl (26) is not self-locking. Thus, when a torque is applied to parking lock gear (28), locking pawl (26) may be forced out of the teeth of the parking lock gear. In the engaged state, this is prevented by cone (29), which can be moved to the right in the diagram until locking pawl (26) is blocked from moving upward in the diagram. To engage the parking lock, the locking pawl must snap into engagement with the teeth of parking lock gear (28). In accordance with the present invention, this is only possible if a certain period of time is available for the locking pawl to slip into the tooth space of parking lock gear (28) to a sufficient depth, and the self-locking portion of cone (29) holds the locking pawl in the engaged state. If the locking pawl does not have sufficient time to snap into engagement with the teeth of the parking lock gear, the locking pawl is forced away, making engagement of the parking lock impossible. In accordance with the present invention, this is the case at or above a vehicle speed greater than a certain limit vehicle speed. At vehicle speeds lower than the limit vehicle speed, the parking lock may be safely engaged without damaging the transmission. The limit vehicle speed is about 5 km/h.

Figure 4:
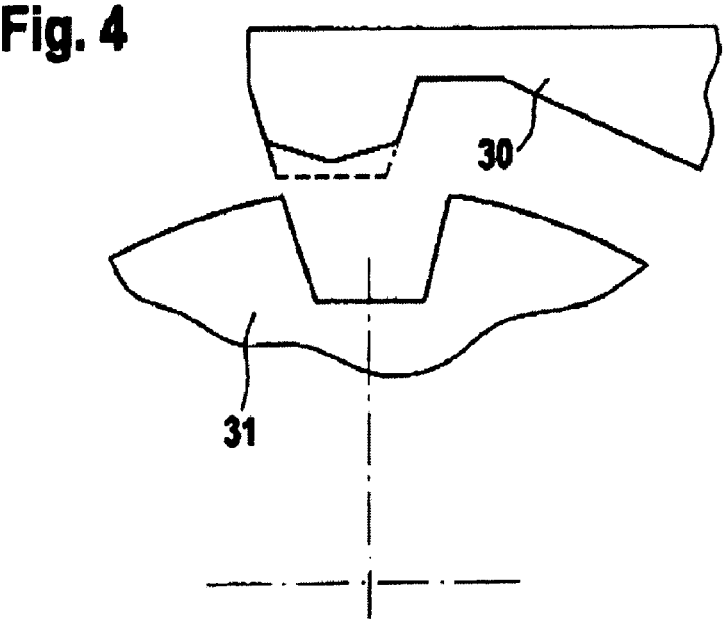
FIG. 4 schematically shows a parking lock in which the tip of a locking pawl has a contour that is modified according to the present invention.

FIG. 4 schematically shows a parking lock in which the tip of locking pawl (30) has a contour that is modified according to the present invention. The diagram shows part of locking pawl (30) and of parking lock gear (31). In accordance with the present invention, the tip of locking pawl (30) is provided with a bevel on two flanks of the pawl. For the purpose of illustration, the former geometry is indicated by a dashed line. Thus, it is achieved that the forcing away of the locking pawl takes place via the flattened bevel of the tip of the locking pawl at vehicle speeds greater than about 10 km/h. In this manner, the impacts occurring between the tip of the locking pawl and the teeth of the parking lock gear when the locking pawl is forced away are advantageously reduced. Thus, the stress on the components mentioned can be reduced while increasing service life.

What is claimed is:

1. A parking lock for an automated transmission of a motor vehicle, the parking lock comprising:
   a first spring-type actuator for engaging the parking lock;
   a transmission actuator;
   a release device operable using the transmission actuator for disengaging the parking lock; and
   a retaining device configured to counteract at least one of the spring-type actuator and a second spring-type actuator so as to hold the parking lock in a disengaged state.

2. The parking lock as recited in claim 1, wherein the release device is disposed in operative connection with at least one of the first and second spring-type actuators.

3. The parking lock as recited in claim 1, further comprising a locking device operable using the first spring-type actuator for engaging the parking lock, and wherein the second spring-type actuator is configured to close the release device.

4. The parking lock as recited in claim 3, wherein the release device is disposed in operative connection with the first spring-type actuator so as to preload the first spring-type actuator when the parking lock is disengaged by the release device.

5. The parking lock as recited in claim 4, wherein the first spring-type actuator has a first predetermined spring tension sufficient to move the release device to a predetermined position when the parking lock has been disengaged.

6. The parking lock as recited in claim 3, wherein the release device is disposed in operative connection with the locking device so that when the parking lock is disengaged by the release device, the locking device is opened, and the transmission is unlocked.

7. The parking lock as recited in claim 6, wherein the operative connection is releasable.

8. The parking lock as recited in claim 5, wherein the second spring-type actuator has a second predetermined spring tension that is lower than the first predetermined spring tension.

9. The parking lock as recited in claim 8, wherein the retaining device is configured to counteract second predetermined spring tension.

10. The parking lock as recited in claim 1, further comprising:
   a locking device having an actuating element;
   a parking lock gear having a plurality of teeth; and
   a locking pawl in operative connection with the teeth, so that the locking pawl is operatable to engage the teeth for locking the transmisstion at vehicle speeds less than a predetermined vehicle speed and the locking pawl is prevented from engaging the teeth of the parking lock gear at vehicle speeds greater than the predetermined limit vehicle speed,
   wherein the actuating element is operable so as to block movement of the locking pawl and engage the parking lock.

11. The parking lock as recited in claim 10, wherein the locking pawl includes a tip having a specific contour such that, when the locking pawl is prevented from engaging the teeth of the parking lock gear, a stress on contacting portions of the locking pawl and the teeth is minor.

12. The parking lock as recited in claim 11, wherein the contour includes a bevel on at least one flank of the locking pawl.

13. The parking lock as recited in claim 12, wherein the contour has a bevel on two flanks of the locking pawl.

* * * * *